(12) United States Patent
Broggi

(10) Patent No.: US 11,702,514 B2
(45) Date of Patent: Jul. 18, 2023

(54) UNIVERSAL PIGMENTARY PREPARATIONS FOR COLOURING AND REENFORCING PLASTICS

(71) Applicant: Giovanni Broggi, Milan (IT)

(72) Inventor: Giovanni Broggi, Milan (IT)

(*) Notice: Subject to any disclaimer, the term of this patent is extended or adjusted under 35 U.S.C. 154(b) by 1121 days.

(21) Appl. No.: 16/344,029

(22) PCT Filed: Oct. 27, 2017

(86) PCT No.: PCT/EP2017/077554
§ 371 (c)(1),
(2) Date: Apr. 23, 2019

(87) PCT Pub. No.: WO2018/078072
PCT Pub. Date: May 3, 2018

(65) Prior Publication Data
US 2019/0338085 A1    Nov. 7, 2019

(30) Foreign Application Priority Data

Oct. 28, 2016  (IT) .................. 102016000109323

(51) Int. Cl.
| C09D 7/45 | (2018.01) |
| C09D 7/40 | (2018.01) |
| C09D 7/61 | (2018.01) |
| C09D 7/65 | (2018.01) |
| C09D 17/00 | (2006.01) |
| C08J 3/22 | (2006.01) |
| C08J 3/20 | (2006.01) |
| C08K 3/013 | (2018.01) |
| C08K 5/00 | (2006.01) |

(52) U.S. Cl.
CPC .............. *C08J 3/226* (2013.01); *C08J 3/203* (2013.01); *C09D 7/45* (2018.01); *C09D 7/68* (2018.01); *C09D 7/69* (2018.01); *C09D 17/003* (2013.01); *C09D 17/008* (2013.01); *C08J 2300/22* (2013.01); *C08J 2355/02* (2013.01); *C08J 2391/06* (2013.01); *C08J 2400/22* (2013.01); *C08J 2455/02* (2013.01); *C08K 3/013* (2018.01); *C08K 5/0041* (2013.01)

(58) Field of Classification Search
None
See application file for complete search history.

(56) References Cited

U.S. PATENT DOCUMENTS

| 3,778,288 A | 12/1973 | Ridge et al. |
| 4,279,802 A | 7/1981 | Laely et al. |
| 5,484,837 A | 1/1996 | Kung et al. |
| 5,936,021 A | 8/1999 | Bryant et al. |
| 6,046,265 A | 4/2000 | Clark et al. |
| 6,063,182 A | 5/2000 | Babler |
| 6,649,122 B1 | 11/2003 | Lough et al. |
| 2002/0013397 A1 | 1/2002 | Kawamura et al. |
| 2006/0223932 A1 | 10/2006 | Kieser et al. |
| 2008/0085959 A1 | 4/2008 | Mueller et al. |
| 2009/0286176 A1 | 11/2009 | Ohmura et al. |
| 2010/0174046 A1 | 7/2010 | Liu et al. |
| 2010/0298472 A1 | 11/2010 | Bardelli |
| 2010/0300327 A1 | 12/2010 | Sasada et al. |
| 2010/0322879 A1 | 12/2010 | Gobelt et al. |
| 2011/0060061 A1 | 3/2011 | Smink et al. |
| 2011/0313089 A1* | 12/2011 | Fischer .................. C09K 23/16 106/505 |
| 2013/0213268 A1 | 8/2013 | Broggi |
| 2014/0187662 A1 | 7/2014 | Lee et al. |

FOREIGN PATENT DOCUMENTS

| CN | 1199070 A | 11/1998 |
| CN | 1757672 A | 4/2006 |
| CN | 1836001 A | 9/2006 |
| CN | 101177521 A | 5/2008 |
| CN | 101367969 A | 2/2009 |
| CN | 101450287 A | 6/2009 |
| CN | 101870823 A | 10/2010 |
| CN | 102400236 A | 4/2012 |
| CN | 103360670 A | 10/2013 |
| CN | 103525028 A | 1/2014 |
| CN | 103709497 A | 4/2014 |
| CN | 103709611 A | 4/2014 |
| CN | 103911019 A | 7/2014 |
| CN | 103937173 A | 7/2014 |
| CN | 104059299 A | 9/2014 |
| CN | 104194406 A | 12/2014 |
| CN | 104356520 A | 2/2015 |
| CN | 104530539 A | 4/2015 |
| CN | 104532387 A | 4/2015 |
| CN | 105936728 A | 9/2016 |
| CN | 106046709 A | 10/2016 |
| CN | 106084674 A | 11/2016 |

(Continued)

OTHER PUBLICATIONS

International Search Report and Written Opinion issued in corresponding International Patent Application No. PCT/EP2017/077554 dated Mar. 12, 2018 (18 pages).

(Continued)

*Primary Examiner* — Sheeba Ahmed

(74) *Attorney, Agent, or Firm* — Kilyk & Bowersox, P.L.L.C.

(57) ABSTRACT

The invention concerns a pigmentary preparation having universality of use in tinting plastics.

18 Claims, 2 Drawing Sheets

(56) References Cited

FOREIGN PATENT DOCUMENTS

| | | |
|---|---|---|
| CN | 106367836 A | 2/2017 |
| DE | 202004010082 U1 | 11/2005 |
| EP | 2240543 B1 | 8/2012 |
| GB | 1249720 A | 10/1971 |
| JP | 54120660 A | 9/1979 |
| JP | 57207652 A | 12/1982 |
| JP | 693201 A | 4/1994 |
| JP | 9143276 A | 6/1997 |
| JP | 10279877 A | 10/1998 |
| JP | 2002328490 A | 11/2002 |
| TW | 201016309 A | 5/2010 |
| WO | 2016088767 A1 | 6/2016 |
| WO | 2017029290 A1 | 2/2017 |

OTHER PUBLICATIONS

Kim et al., "Effects of Dispersing Agents on Dispersity and Mechanical Properties of Carbon Black/PET," Polymer Engineering and Science, 1999, vol. 39, No. 3, pp. 500-507.

* cited by examiner

UNIVERSAL PIGMENTARY PREPARATIONS FOR COLOURING AND REENFORCING PLASTICS

This application is a National Stage Application of PCT/EP2017/077554, filed Oct. 27, 2017, which claims priority to Italian Patent Application No. 102016000109323, filed Oct. 28, 2016.

FIELD OF THE INVENTION

The present invention concerns pigmentary preparations, intended for the colouring and for reinforcing plastic materials which comprise pigments, and/or other additives and/or fillers; and their use as dye concentrates.

BACKGROUND

In order to obtain objects and manufactured articles made of plastic or rubber it is generally necessary to introduce polymers in the basic raw materials, namely some substances suitable to provide them with the desired characteristics in the finished product. These substances can be: substances that impart colour to the material, such as pigments or dyes or substances that impart functional properties to the manufactured articles, such as an improved resistance to fire and/or light or even substances that improve the mechanical and/or thermal properties of the finished product. Often additives are also used to protect the polymer in the transformation process into manufactured article, such as thermal stabilizers, thermo-oxidants, fluidizing agents, etc., commonly defined as process additives, since the transformation of the plastic material into manufactured articles generally takes place at elevated temperatures and in the presence of relevant mechanical efforts. Instead of adding these substances directly to the polymer to be modified, the industrial practice mainly uses an indirect technology, the masterbatch technology. The masterbatches, also called pigment concentrates, are formulations consisting of a base, commonly called carrier, and high amounts of one or more additives.

The masterbatch technology involves the preliminary preparation of a concentrate comprising the desired additives, and then the addition of this concentrate to the base polymer in quantities calculated so as to obtain the desired percentages of additive/s in the product. The choice of the masterbatch technology is due to reasons of cost, safety in the handling of the additives, etc. The masterbatch is often prepared by specialized companies, other than those that then use it in the transformation into final plastic products.

The solid carrier present in the pigmentary preparations is typically a polymeric material, a waxy product or their mixture. Since the carrier will have to be mixed with the polymer to be modified and, at the end, will remain incorporated in the final product, it is essential that it is compatible and readily miscible with the polymer to be modified in the finished product.

The high complexity of this field depends, besides upon the number of carrier (some tens), primarily on the combination between them and the number of colours required for each carrier. Each colour is prepared by mixing the necessary pigments for each requested tone, namely colouring additives (for example to get the green the white pigment is blended with a yellow pigment and a blue pigment) with the carrier. This mixture is extruded and then granulated.

Therefore, it is quite clear that the production of the masterbatches is tailor-made and must therefore be carried out each time for the tones which cannot be obtained through the use of a single pigment. This complexity requires a very laborious management of supplies and of storage, a part of which becomes in time slow moving stock, i.e. slow rotation materials. Such materials, therefore, lie for long periods of time in storage, and can thus become unsaleable or hardly saleable batches, a problem which inevitably increases with the number of products to manage.

It is therefore a primary object of the present invention to provide a "universal" pigmentary preparation, capable to eliminate the complexity and thus capable to provide for a less expensive management of the production of coloured manufactured articles.

It should be considered that the currently employed system based on extrusion does not allow to have organic pigment concentrates averagely greater than 40%.

The patent EP 0910603 B1 describes the production of masterbatches, or additive concentrates, using low energy mixing processes. Additive particles are held together by carrier particles that retain their particulate identity such that the masterbatch is composed of agglomerates of carrier particles and agglomerate particles.

U.S. Pat. No. 3,778,288 discloses a method in which pigment and dispersants such as Fischer-Tropsch waxes are combined and granulated using high intensity mixing. The resulting granules have a size between 10 and 70 mesh (2000 to 210 microns) with 90-95% yield (column 4, lines 45-46). Smaller particles exhibit inferior dispersion to larger particles (column 8, lines 67-68).

The object of the present invention is therefore to provide universal pigmentary preparations, which, however, overcome the drawbacks of those currently known.

More precisely, the main objects of the present invention are:
universality of use of the pigmentary products,
minor complexity of the process of production;
reduction of stock
reduction of the conversion costs;
high concentration of the pigments
improvement of the colouring and physical-chemical properties;
compliance of the final products with current standards for use in the food, medical, or even in the toy field

SUMMARY OF THE INVENTION

The inventors of the present invention have found that some specific dispersing agents have also the features of a wetting agent. These compounds allowed to the inventors to prepare pigmentary preparations having universality use for colouring plastics.

In one aspect, the present invention relates to a pigmentary preparation comprising, consisting essentially of, or consisting of:
at least one dispersing-wetting agent selected from the group consisting of wax-based powdered processing additive with pigment-affinic groups, acidic polyester based additive with pigment-affinic group, modified polyether with groups of high pigment affinity, copolymers of styrene and polyethers, amides of maleic acid, amphiphilic copolymers, modified polyacrylate with groups of high pigment affinity, polyester based block copolymer, high molecular weight polyurethane polymer, polyester-polyamine-polyolefin terpolymers, and modified polysiloxanes with epoxy or urethane groups, having said one dispersing-wetting agent a melting point in the range from 50-150° C. and at least one pigmentary additive selected in the group consisting of inorganic pigment, organic pigment, carbon black and dyes, and optional additives, wherein the particle diameter D50 (by number) of the at least one pigmentary additive of the pigmentary preparation is the range from 0.5 to 3.5 μm, and the pigmentary preparation comprises at least 60% by weight of the at least one pigmentary additive with respect to the total weight of the pigmentary preparation. According to the invention the sole essential ingredients of the pigmentary preparation are the at least one dispersing-wetting agent and the at least one pigmentary additive.

The inventors found out a group of compounds capable to have wetting property, i.e. capable of reducing the interfacial strength of the agglomerates of primary pigment particles i.e., capable of stabilizing said primary pigment particles thus avoiding their re-agglomeration. Such wetting-dispersing agents preferably include pigment affinic groups such as aromatic rings, polyethers, hydrogen bonding groups, for example, nitrogen containing groups, e.g., primary, secondary, and tertiary amines, and amide, imide, and imine containing groups, carboxylic acid groups, hydroxyl groups, carbonyl groups, and carboxyl groups. For polymeric or oligomeric wetting-dispersing agents, the pigment affinic groups may be part of the backbone or incorporated in a side-chain.

In view of this double property wetting and dispersing agents specific for single polymer can be avoided during the tinting of the polymers. The wetting-dispersing agents of the invention resulted to be compatible with all the families of plastics to be colored. In this way, the pigmentary preparations of the invention allows an universal tinting system since they can have universality of use; that is, they can be used in multiple polymers, for example, at least three different polymers. Exemplary polymers include but are not limited to polyethylene-based polymers, polystyrene, SAN, HIPS, ABS, ASA, chlorovinylic polymers, polyacrylates, polyamides, polycarbonates, polyesters, polyurethanes, and thermoplastic elastomers. When uniformly mixed with a polymer such that the pigmentary filler loading is from 0.5 to 1 wt %, the resulting coloured composition preferably exhibits a tinting strength at least 20% better, at least 25% better, at least 30% better, at least 35% better, at least 40% better, for example, 20-50% better, than for a mixture having the same composition but prepared by individually adding each component to a mixing apparatus and combining the components (e.g., pigmentary filler, dispersing-wetting agent, polymer). Preferably, the pigmentary preparation provides this improvement in tinting strength to at least three different polymers.

In one aspect, the invention concerns a final pigmentary preparation in which the at least one pigmentary additive has a particle diameter D50 (by number) in the range from 0.5 to 3.5 μm, and comprises at least 60% by weight of the at least one pigmentary additive with respect to the total weight of the pigmentary preparation. The particle size of the pigmentary additive in the final pigmentary preparation indicates the degree of dispersion of the pigmentary additive in the pigmentary preparation. Prior to milling, the pigmentary additive powder is in the form of agglomerated and/or aggregated particles typically having a particle size in excess of 7 micrometers, for example, 7-10 micrometers. For organic pigments, the aggregates comprise multiple pigment crystallites grown together at their surfaces. The pigment crystallites and aggregates join at their edges and corners to form agglomerates. The milling process separates the aggregates of organic pigment from one another with the help of the dispersing-wetting agent and also reduces the aggregate size, and the dispersing-wetting agent prevents the individual milled particles, which may include single crystallites or primary particles, from re-adhering, or flocculating. In contrast, carbon black is an aggregate of primary particles configured similarly to a bunch of grapes. The primary particles are adhered to one another by covalent interactions, and the individual aggregates are typically not broken into primary particles by milling. The carbon black aggregates adhere to one another by non-covalent interactions to form agglomerates. In this case, the milling process separates the carbon black aggregates from each other, and the dispersing-wetting agent prevents the carbon black aggregates from re-agglomerating.

The pigmentary preparation of the invention can be obtained as free-flowing powder or as microgranules, that both can be measured by sieving, for example, with a Digital Electromagnetic Sieve Shaker of Filtra Vibration mod. FTL 0200.

In a preferred embodiment of microgranules, the granulometry of all the microgranules of the pigmentary preparation is in the range from 60 to 500 μm, more preferably 80-350 μm as measured (for example, with a Digital Electromagnetic Sieve Shaker of Filtra Vibration mod. FTL 0200). Preferably, the microgranules are ready-to-use microgranules containing all the active ingredients and all the additives (desired to be used in the master batch composition) to be used as a ready-to-use pigmentary preparation.

When in the present invention the definition "pigmentary additive" is used, it is intended any pigmentary additive selected from the group consisting of inorganic pigment, organic pigment, carbon black and dyes.

Unless otherwise indicated, when in the present invention the particle diameter D10, D50 and D90 of the pigmentary additive is indicated, it is referred to a particle diameter (by number) of the at least pigmentary additive measured in the final pigmentary preparation by dispersing the final pigmentary preparation in solvent and analysing the dispersion with a laser particle size analyser, for example, with a laser Beckman Coulter Particle Size Analyzer, optical model Fraunhofer.rf780z. The particle size of the pigmentary additive in the final pigmentary preparation may be obtained by dispersing the pigmentary preparation in an appropriate solvent vehicle, for example, butyl acetate. The dispersant-wetting agent is completely solubilized in the tested conditions, and therefore the apparatus measures only the size of the milled pigment dispersed in solvent. D10 is greater than or equal to the diameter of 10% of the particles in a given population; D50 is greater than or equal to the diameter of 50% of the particles in the population; and D90 is greater than or equal to the diameter of 90% of the particles in the population.

When in the present invention the granulometry of the microgranules or powder is indicated it is meant the particle diameter as measured with suitable filters. When in the present invention the definition "free-flowing powder" is used, it is meant to indicate particles of the final pigmentary preparation having a granulometry less than 50 μm.

The pigmentary preparations of the invention are preferably in the form of a free-flowing powder or are microgranules. Alternatively or in addition, the pigmentary preparation is in the form of a) a free-flowing powder having D20 of at least 0.8 microns and D90 up to 5 microns when measured in the dry state by a laser particle size analyzer, for example, a Malvern Mastersizer 2000 particle size analyzer equipped with a Scirocco 2000 dry powder sample introduction accessory at a pressure of 3.5 bar or b) microgranules having D20 of at least 10 microns and D90 up to 1000 microns when measured in the dry state by a laser particle size analyzer at a pressure of 3.5 bar.

All the embodiments of the pigmentary preparation as microgranules preferably have a granulometry of the ingredients in the range from 60 to 500 μm, more preferably 80-350 μm.

The at least one pigmentary additive of the final pigmentary preparation in all the embodiments of the invention preferably has also a particle diameter D90 (by number) in the range of 0.9 to 4 μm.

The at least one pigmentary additive of the final pigmentary preparation in all the embodiments of the invention preferably has also a particle diameter D10 (by number) in the range of 0.5 to 1 μm.

In another aspect, the invention concerns a process for preparing the pigmentary preparation of the invention, wherein the ingredients are treated with an apparatus capable to infer a particle diameter D50 (by number) of the at least one pigmentary additive in the range of 0.5 to 3.5 μm.

In a preferred aspect, the invention relates the pigmentary preparation according to the invention, wherein the pigmentary preparation is obtainable by a pigmentary composition through a process comprising the following steps:

1) introducing into a mill apparatus, preferably a dry mill apparatus, a pigmentary composition comprising, consisting essentially of, or consisting of:
   at least one dispersing-wetting agent selected from the group consisting of wax-based powdered processing additive with pigment-affinic groups, acidic polyester based additive with pigment-affinic group, modified polyether with groups of high pigment affinity, copolymers of styrene and polyethers, amides of maleic acid, amphiphilic copolymers, modified polyacrylate with groups of high pigment affinity, polyester based block copolymer, high molecular weight polyurethane polymer, polyester-polyamine-polyolefin terpolymers, and modified polysiloxanes with epoxy or urethane groups, having said one dispersing-wetting agent a melting point in the range from 50-150° C. and
   at least one pigmentary additive selected in the group consisting of inorganic pigment, organic pigment, carbon black and dyes, and
   optional additives,
2) mixing and milling the pigmentary composition of step 1);
3) downloading the so obtained pigmentary preparation as free-flowing powder or microgranules.

Preferably, in step 1) further additives, such as the antistatic agents, fillers, etc. discussed elsewhere herein, may be added.

The dispersing-wetting agent has preferably a number average molecular weight of 5000 to 35000 g/mol. Because the pigmentary additive is preferably charged to the mill as a solid, the resulting pigmentary preparation preferably has low levels of water or other solvent, for example, less than 3 wt %, less than 2.5%, or less than 2%. For example, the pigmentary preparation may have less than 3 wt %, less than 2.5%, or less than 2% water.

Without being bound to any theory and as it will be apparent from the detailed description and from the examples, the process of the invention leads to obtain a superior grinding and disaggregation of the primary particles of the pigment, and therefore their excellent homogenization and dispersion. The process of the present invention allows to obtain homogeneity and fineness of grinding (comparable with those obtained through the traditional extrusion process) with very fine particle dispersion, thus overcoming the drawbacks of the pigmentary preparations of the prior art.

The process of the invention allows to obtain a pigmentary preparation in step 3) as free flowing powder or microgranules, wherein the at least pigmentary additive in the pigmentary preparation has a particle diameter D50 (by number) in the range of 0.5 to 3.5 μm; also a particle diameter D90 (by number) in the range of 0.9 to 4 μm; and also a particle diameter D10 (by number) in the range of 0.5 to 1 μm, measured by a laser particle size analyser following dispersion in solvent, for example, with a laser Beckman Coulter Particle Size Analyzer, optical model Fraunhofer.rf780z. Advantageously the microgranule of the invention is a ready-to-use product.

Therefore, the microgranular pigmentary preparations of the invention are universal, having a high concentration of pigment and a narrow granulometry (60-500 μm).

In another aspect, the invention concerns a universal tinting system comprising a limited number of basic colours corresponding to a limited set of pigmentary preparations suitable for the preparation of manufactured plastic and rubber articles having different colour shades. The pigmentary preparations of the invention allow the preparation of colour tones by simple dry mixing of the monocoloured (monopigment) basic pigmentary preparations of the invention (e.g., about 16-22) without the need of a tailor-made processing of the mixture of pigments through the extrusion process.

Therefore, the invention also relates to a tinting system comprising a series of pigmentary preparations having desired shades of colours (RAL (ReichsAusschuss für Lieferbedingungen), NCS (Natural Color System), BS (British Standards), etc.) obtainable simply by dry mixing two or more pigmentary preparations according to the invention.

Therefore, in another aspect the invention relates to a use of the pigmentary preparation according to the invention to colour all the kinds of plastic materials, for example, polyethylene-based polymers, polystyrene, SAN, HIPS, ABS, ASA, chlorovinylic polymers, polyacrylates, polyamides, polycarbonates, polyesters, polyurethanes, and thermoplastic elastomers. Preferably, when the coloured plastic composition includes from 0.5 to 1% by weight of the pigmentary additive, it exhibits a tinting strength at least 20% better, for example, 20-50% better, than for a mixture having the same composition but prepared by individually adding each component to a mixing apparatus and combining the components into a uniform mixture. Preferably, a given pigmentary preparation is suitable to colour at least three kinds of plastic materials, for example, at least three of polyethylene-based polymers, polystyrene, SAN, HIPS, ABS, ASA, chlorovinylic polymers, polyacrylates, polyamides, polycarbonates, polyesters, polyurethanes, and thermoplastic elastomers. Preferably, each of a first, second and third uniform mixture of the pigmentary preparation with first, second, and third polymers such that the resulting first, second and third mixtures contain from 0.5 to 1% by weight of pigment exhibits a tinting strength at least 20% better, for example, 20-50% better, than for a mixture having the same composition but prepared by individually adding each component to a mixing apparatus and combining the components into a uniform mixture.

A plastic material is for example selected from Polyethylenic products (e.g., HDPE (high density polyethylene), LDPE (low density polyethylene), LLDPE (linear low density polyethylene), MDPE (medium-density polyethylene), EVA (ethylene vinyl acetate), EVOH (ethylene vinyl alcohol)); Polypropylenic products (e.g., PP (polypropylene), PP copolymers, EPR (ethylene propylene rubber), EPDM (ethylene propylene diene monomer (M-class) rubber)); Styrenics (e.g., PS (Polystyrene), SAN (styrene-acrylonitrile copolymer), HIPS (High Impact Polystyrene), ABS (Acrylonitrile butadiene styrene), ASA (Acrylic-styrene-acrylonitrile copolymers)); chlorovinylic Polymers (e.g. PVC (Polyvinyl chloride), unplasticized and plasticized); Acrylics (e.g., PMMA (Poly(methyl methacrylate)), polyacrylates); Polyamides (e.g., PA6, PA6,6, PA11, PA12, and their copolymers); Polycarbonate and its blends (e.g. PC/ABS (polycarbonate/Acrylonitrile Butadiene Styrene), PC/Polyesters); Polyesters (e.g. PET (Polyethylene terephthalate), PBT (Polybutylene terephthalate), copolyesters); Polyurethanes (e.g., TPU (Thermoplastic polyurethane)); Thermoplastic Elastomers (e.g., TPO (Thermoplastic olefin), TPV (Thermoplastic vulcanizates)). The polyethylenic and polypropylenic products may be obtained using metallocenic catalysts or using other polymerization methods known to those of skill in the art.

Furthermore, and surprisingly the pigmentary preparation of the invention allowed to ameliorate the technical properties and mechanical performances of the final coloured plastic product as it will be evident from the experimental part of the invention.

Specifically, the MFR data demonstrate the processability and the good dispersion of the coloured samples (not relevant differences if compared with the non-coloured sample). The Izod test (Impact Strength) showed much higher results (+77%) for coloured samples (with the pigmentary preparations of the invention) compared to the non-coloured samples, as confirmed by examining the areas subjected to fracture, which showed a homogeneous bleaching and a well-developed deformation process. The Rockwell Hardness test or Rockwell Hardness highlighted, before Xenotest aging, significantly higher values (+37%) for samples coloured with the pigmentary preparation of the invention and after 1000 hours of Xenotest aging, values indicating an opposite behaviour between coloured and non-coloured samples. While coloured samples virtually retained their original values, showing only a moderate change, the non-coloured sample had suffered a strong reduction. This phenomenon confirmed the increased fragility of the non-coloured sample (as confirmed by the results of the Impact test). The results of the colour fastness test, measured after 1000 hours of Xenotest exposure, were amazing for coloured samples. No discolouration was observed in the colorimetric analysis and in the grey scale. In short, the behaviour of coloured samples was significantly better than the one of the non-coloured sample.

DETAILED DESCRIPTION OF THE INVENTION

Figure 1:
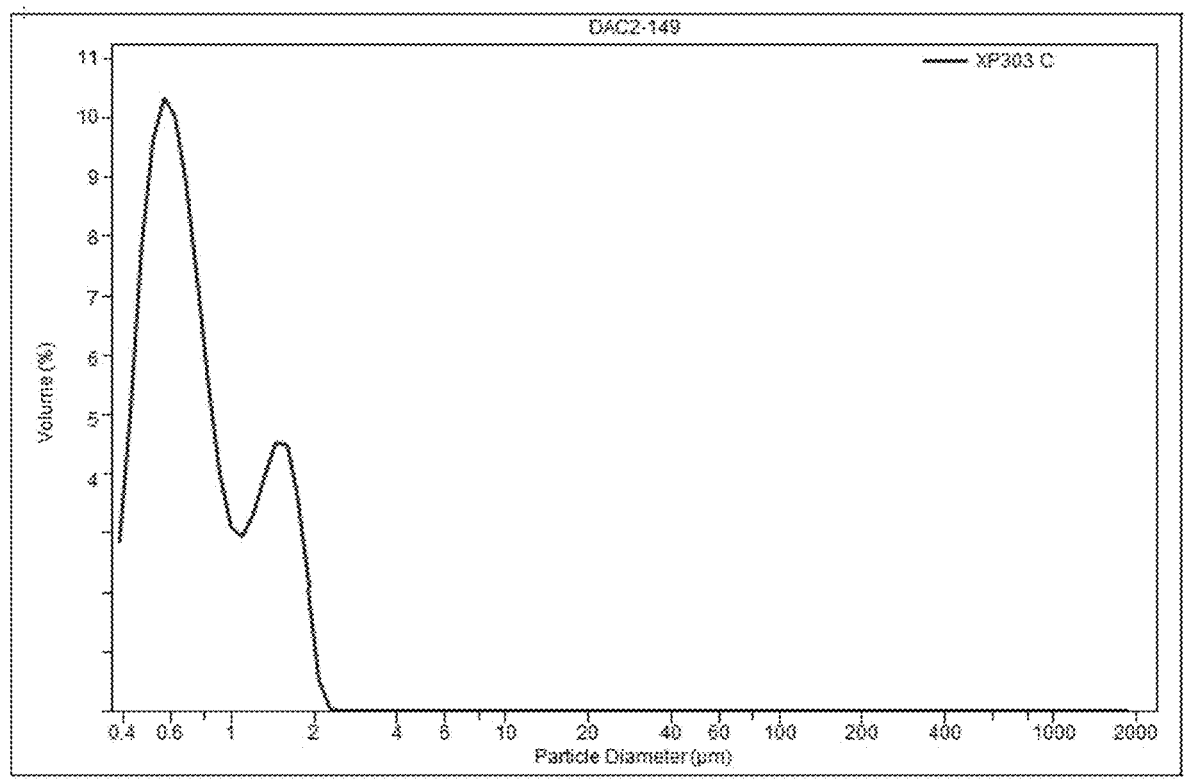
FIG. 1 is the graph of the dimensional values of the pigmentary additive of the final pigmentary preparation of example 1.
Figure 2:
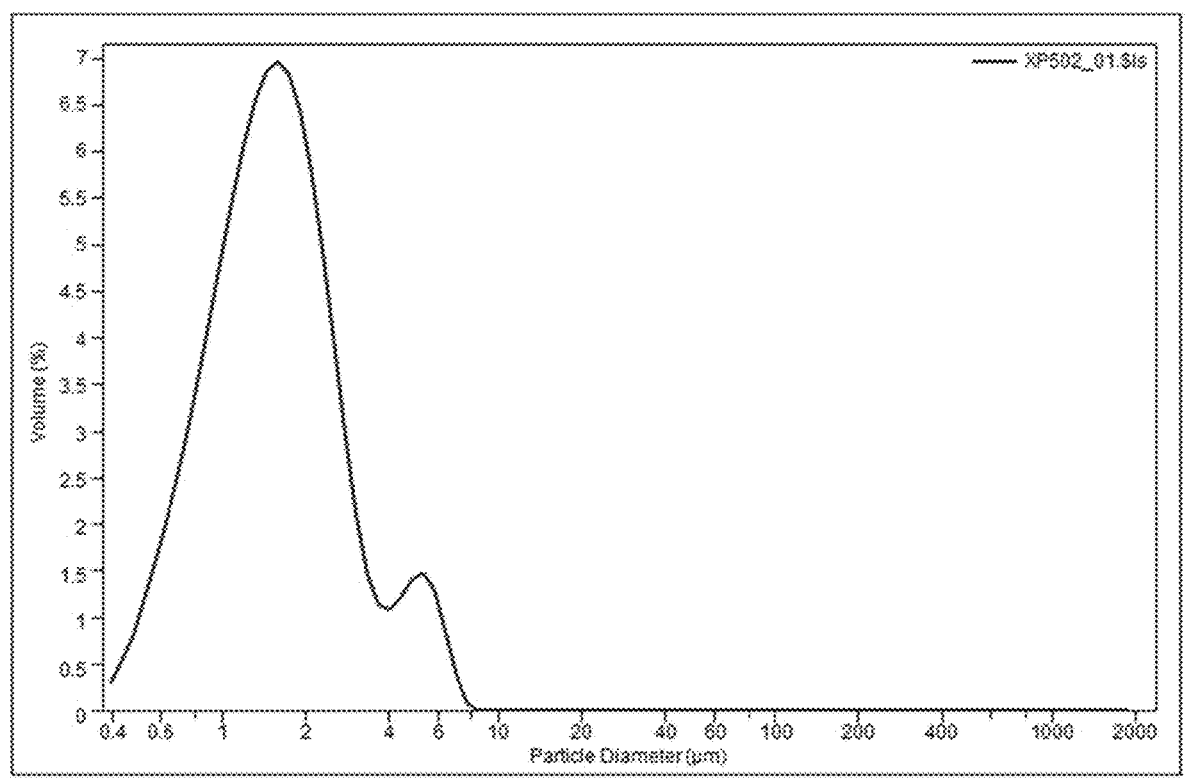
FIG. 2 is the graph of the dimensional values of the pigmentary additive of the final pigmentary preparation of example 6.

In one aspect, the present invention therefore relates to a pigmentary preparation comprising, consisting essentially of, or consisting of:

at least one dispersing-wetting agent selected from the group consisting of wax-based powdered processing additive with pigment-affinic groups, acidic polyester based additive with pigment-affinic group, modified polyether with groups of high pigment affinity, copolymers of styrene and polyethers, amides of maleic acid, amphiphilic copolymers, modified polyacrylate with groups of high pigment affinity, polyester based block copolymer, high molecular weight polyurethane polymer, polyester-polyamine-polyolefin terpolymers, and modified polysiloxanes with epoxy or urethane groups, having said one dispersing-wetting agent a melting point in the range from 50-150° C. and at least one pigmentary additive selected in the group consisting of inorganic pigment, organic pigment, carbon black and dyes, and optional additives, wherein the particle diameter D50 (by number) of the at least one pigmentary additive of the pigmentary preparation is the range from 0.5 to 3.5 µm, and the pigmentary preparation comprises at least 60% by weight of the at least one pigmentary additive with respect to the total weight of the pigmentary preparation. As stated above, when in the present invention the definition "pigmentary additive" is used, it is intended a pigmentary additive selected from the group consisting of inorganic pigment, organic pigment carbon black and dyes. The term high molecular weight preferably indicates a number average molecular weight from 5000 to 35000 g/mol. Amphiphilic copolymers are copolymers including both hydrophilic and hydrophobic mers arranged randomly, in blocks, or using some other arrangement such as a gradient.

For example a pigmentary additive can be one or more of the following compounds:

| Colour | Pigment Grade | Colour Index |
|---|---|---|
| White | Titanium Dioxide | p.White 6 |
| Yellow | Yellow Iron Oxide | p.Yellow 42 |
| Yellow | Monoazo | P.Yellow 168 |
| Yellow | Monoazo | P.Yellow 62 |
| Yellow | Isoindlinone | P.Yellow 109 |
| Yellow | Isoindlinone | P.Yellow 110 |
| Yellow | Yellow Iron Oxide | p.Yellow 119 |
| Yellow | Antraquinone | p.Yellow 199 |
| Yellow | Disazocondensation | p.Yellow 128 |
| Yellow | Disazocondensation | p.Yellow 93 |
| Yellow | Bismuth Vanadate | P.Yellow 184 |
| Yellow | Mixed Metal Oxide | P.Yellow.216 |
| Yellow | Diarilide | p.Yellow 83 |
| Yellow | Monoazoico | P.Yellow 65 |
| Yellow | Irgalite | P.Yellow 13 |
| Yellow | Irgalite | P.Yellow 14 |
| Yellow | Irgalite | P.Yellow 62 |
| Yellow | Irgalite | P.Yellow 83 |
| Yellow | Benzimidazolone | P.Yellow 180 |
| Yellow | Benzimidazolone | P.Yellow 151 |
| Yellow | Diarylide | P.Yellow 17 |
| Yellow | Chinoftalone | p.y.138 |
| Yellow | Monoazoico | p.y. 74 |
| Yellow | Isoindoline | p.y. 139 |
| Orange | Dichetopirrolpirolo (DPP) | P.Orange 73 |
| Orange | Isoindoline | P.Orange 61 |
| Orange | Dichetopirrolpirolo (DPP) | P.Orange 71 |
| Orange | Benzimidazolone | P.Orange 64 |
| Orange | Dianisidine | P.Orange 16 |
| Orange | Azo | P.Orange 83 |
| Orange | Disazopirazolone | P.Orange 34 |
| Red | Red Iron Oxide | P.Red 101 |

-continued

| Colour | Pigment Grade | Colour Index |
|---|---|---|
| Red | Dichetopirrolpirolo (DPP) | P.Red 254 |
| Red | Dichetopirrolpirolo (DPP) | P.Red 255 |
| Red | Disazocondensation | P.Red 166 |
| Red | Disazocondensation | P.Red 144 |
| Red | Azo condensation | P.Red 214 |
| Red | Antraquinone | P.Red 177 |
| Red | Perylene | P.Red 179 |
| Red | Benzidine | P.Red 38 |
| Red | Azo | P.Red 60 |
| Red | Antraquinone | P.Red 177 |
| Red | Single Azo | P.Red 185 |
| Red | Cinquasia Magenta | P.Red 202 |
| Red | Quinacridone | P.Red 207 |
| Red | azoico naftolo AS | P.Red 170 |
| Red | Chinacridone | P.Red 122 |
| Red | azoico naftolo AS | Pig.Red 146 |
| Violet | Diossazina | P.Violet 23 |
| Violet | Diossazina | P.Violet 37 |
| Violet | Chinacridone | P.Violet 19 |
| Blue | Phthalo Blue Alfa | P.Blu 15:1 |
| Blue | Phtalo Blue Beta | P.Blu 15:3 |
| Blue | Phthalo Blue Alfa | P.Blu 15:0 |
| Blue | Phthalo Blue | P.Blu 15:2 |
| Blue | Phthalo Blue | P.Blu 15:4 |
| Blue | Idanthrone | P.Blu 60 |
| Green | Phthalo Green | p.g.7 |
| Green | Phthalo Green | p.g.36 |
| Brown | Chrome Titanate | p.br.24 |
| Black | Carbon Black | p.b. 7 |
| Black | Carbon Black | p.b. 6 |

The pigmentary preparation of the invention is in the form of a free-flowing powder or in form of microgranules.

The pigmentary preparation of the invention comprises at least 60% by weight of at least one pigmentary additive with respect to the total weight of the pigmentary preparation, more preferably 70%, still more preferably 85%, for example, up to 95% by weight.

The pigmentary preparation in the form of microgranules has a granulometry of the ingredients in the range from 60 to 500 µm, more preferably 80-350 µm as measured (for example, with a Digital Electromagnetic Sieve Shaker of Filtra Vibration mod. FTL 0200).

The at least one pigmentary additive in the final pigmentary preparation of the invention has also a particle diameter D90 (by number) in the range of 0.9 to 4 µm. The at least one pigmentary additive in the final pigmentary preparation of the invention has also a particle diameter D10 (by number) in the range of 0.5 to 1 µm. The pigmentary composition for obtaining the pigmentary preparation of the invention further comprises other optional additives selected from the group consisting of stabilizers to heat, oxygen (antioxidants), and light, transporters of electric charges (antistatic) and heat, thermal additives, antiblocking additives, anti-collapse additives, antioxidant additives, antistatic additives, UV stabilizers additives, fillers, anti-fibrillating agents, processing Aids, expanding agents, drying/compatibilizing additives, Lubricants, nucleating/clarifying additives, flame retardants, optical brightener/tracing additives, slipping additives. Organophosphites and phenolic antioxidants can be cited among the stabilizers to heat.

Thermally conductive plastics, graphite, aluminium nitride, and boron nitride can be cited among the transporters of heat.

Silica, talc, calcium carbonate, alumina-silicate ceramics, mica, bis-amides, primary and secondary amides, organic and metallic stearates, silicone, and polytetrafluoroethylene can be cited among the antiblocking additives.

Electrically conductive fillers, glycerol monostearate, ethoxylated fatty acid amines, diethanolamides, and polyether block amides can be cited among the antistatic additives.

Oxanilides, benzophenones, benzotriazoles, and hydroxyphenyltriazines can be cited among the UV stabilizers.

Calcium carbonate, kaolin, barium sulphate, talc, wollastonite, silica and their derivates such as fumed silica, and mica can be cited among the fillers.

Calcium carbonate, talc, and natural and synthetic rubber can be cited among the anti-fibrillating agents.

Fluoropolymers, precipitated calcium carbonate, and metal stearates can be cited among the processing aids.

Aliphatic hydrocarbons, labile nitrogen compounds, and mixtures of sodium carbonate or sodium bicarbonate and citric acid can be cited among the expanding agents.

Stearic acid, benzoic acid, styrene maleic anhydride, and styrene acrylonitrile copolymer can be cited among the compatibilizing additives.

Molybdenum sulphide and graphite may be cited among the lubricants.

Isophthalic and terephthalic acids, blends of organic diacids with Group II oxides, hydroxides, or acids, talc, sodium benzoate, and ionomers can be cited among the nucleating/clarifying additives.

Halogenated organic compounds can be cited among the flame retardants.

Derivatives of the bis-benzoxazole type such as benzotriazole phenyl coumarins, naphthotriazole phenyl coumarins, and triazine phenyl coumarins can be cited among the optical brighteners.

Unsaturated fatty acid amides, secondary amides, and waxes can be cited among the slipping additives.

Hindered phenols, phosphites, phosphonites, secondary aromatic amines can be listed among the antioxidants.

Hindered amines (HALS (Hindered-amine Light Stabilizers) or HAS (Hindered-amine Stabilizers)) benzophenone, benzotriazoles can be listed among the light stabilizers.

In another aspect, the invention concerns a process for preparing the pigmentary preparation of the invention, wherein the ingredients are treated with an apparatus capable to impart a particle diameter D50 (by number) of the least pigmentary additive in the range from 0.5 to 3.5 µm and to achieve an amount of 60% by weight of at least one pigmentary additive with respect to the total weight of the pigmentary preparation. The amount of the at least one pigmentary additive is at least 60%, preferably 70%, more preferably 85% with respect to the total weight of the pigmentary preparation.

According to the invention, the pigmentary preparation is preferably obtainable by the pigmentary composition.

More preferably, the pigmentary preparation is obtainable by a process which comprises the following steps:

1) introducing into a dry-milling apparatus a pigmentary composition according to the invention comprising, consisting essentially of, or consisting of:

at least one dispersing-wetting agent selected from the group consisting of wax-based powdered processing additive with pigment-affinic groups, acidic polyester based additive with pigment-affinic group, modified polyether with groups of high pigment affinity, copolymers of styrene and polyethers, amides of maleic acid, amphiphilic copolymers, modified polyacrylate with groups of high pigment affinity, polyester based block copolymer, high molecular weight polyurethane polymer, polyester-polyamine-polyolefin terpolymers, and modified polysiloxanes with epoxy or urethane groups, having said one dispersing-wetting agent a melting point in the range from 50-150° C., and at least one pigmentary additive selected in the group consisting of inorganic pigment, organic pigment, carbon black and dyes, 2) mixing and dry milling the ingredients of step 1), and 3) downloading the so obtained pigmentary preparation as free-flowing powder or microgranules.

The dry-milling apparatus is preferred in the present invention with respect to jet milling apparatus and wet milling apparatus. In fact, the dry-milling apparatus allows an adequate milling force, while the known jet milling apparatus is excessively energic, thus compromising the post treatment of the dispersed pigmentary particles and so the stability of the final colour. On the other hand, the wet milling apparatus generally cannot disperse pigment particles to a particle size of <15 micron and requires a further step of drying which makes the complete process more expensive. In the above process all known organic, inorganic pigments, carbon black and dyes are suitable to be used in order to prepare a pigmentary preparation.

Examples of pigmentary additive are listed above.

The preferred dry-milling apparatus used in the processes of the invention can have at least two rotors and can be discontinuous or continuous.

In a preferred embodiment, the pigmentary preparation is obtainable by a process comprising the following steps:

1) introducing into a mill apparatus provided with at least two rotors, being preferably at least one rotor a blade rotor, the pigmentary composition of described above;

2) mixing and milling the pigmentary composition;

3) downloading the so obtained pigmentary preparation.

Both the continuous and the discontinuous apparatuses used in the above processes allow to obtain a pigmentary preparation in step 3) as free flowing powder or as microgranules and having the at least one pigmentary additive with an particle diameter D50 (by number) in the range of from 0.5 to 3.5 µm.

The discontinuous dry-milling apparatus comprises two to seven rotors, for example, three, four, five or six rotors, preferably four.

When the discontinuous mixing apparatus is used the average peripheral speed VPE is comprised in the range of 5-50 m/s and the step 2) of mixing and dry milling is preferably carried out for a time in the range from 10 min and 90 min, for example, from 15-90 min or from 20 to 90 min, until reaching a temperature in the range from 50 to 150° C.

Without being bound to any theory, the inventors of the present invention believe that the final diameter sizes of particles of the at least one pigmentary additive and the fineness of grind of the pigmentary preparation are essential for the final performance of the product (dispersibility and tinting strength).

All apparatuses which allow to have a high number of repeated impacts between the particles and parts of the apparatus, such as for instance rotors, and so the shocks to which the particles of ingredients of the invention are suitable to be used in the invention.

The fineness of the pigmentary additive in the pigmentary preparation is correlated to the number of the shocks which underwent the pigment particles when they collide against each other and against the rotors, and against the internal jacket of the mill-chamber. Without being bound to any theory, it is believed that the milling action of a dry mill over an extended period of time, for example, from 10 to 90 mins, evenly distributes the dispersing-wetting agent among the particles of the pigmentary additive without requiring the use of water or other solvent.

Preferred aspects of VPE, times and final temperatures, can be established according to the characteristics of the ingredients, preferably of the at least one additive selected from the group consisting of inorganic pigment, organic pigment, carbon black and dyes to be processed (i.e. density, oil absorption capacity, specific surface area, etc.).

The product thus obtained in step 3) in the form of free-flowing powder or microgranules is downloaded and advantageously packaged.

Preferably, the dust-free microgranules have a particle diameter in the range from 80 to 350 µm.

When the dry-milling apparatus is discontinuous the granulation plant can be also provided when the product of step c) is a free-flowing powder. Alternatively, the discontinuous apparatus allows to obtain the dust-free microgranules having a particle size in the range from 60 to 500 µm, more preferably 80-350 µm as measured (for example, with a Digital Electromagnetic Sieve Shaker of Filtra Vibration mod. FTL 0200).

Preferably, the granulation step occurs via a rotating screw feeder forcing the product which has reached the preferred temperature in the range from 60° C. to 140° C., to pivot with a regular vortex that causes the formation of very homogeneous spherical granules. The peripheral speed (VPE) of the screw feeder is preferably comprised between 15 and 50 m/sec. After about five minutes uniform microgranules are formed. The temperature is preferably brought below 50° C., thus causing the complete re-solidification of the carrier and making stable the spherical granules.

The obtained products dust-free microgranules have the form of uniform microgranules with a narrow granulometric curve with a granulometry in the range from 60 to 500 µm, more preferably 80-350 µm as measured (for example, with a Digital Electromagnetic Sieve Shaker of Filtra Vibration mod. FTL 0200).

The performances of the pigmentary preparations of the invention i.e. superior deagglomeration and/or disaggregation of pigment particles, dispersion homogeneity, as well as dispersibility and tinting strength as shown in the experimental part, are comparable and, in some cases, even better than the performances obtainable with the traditional extrusion process. The surprising feature of the present pigmentary preparation is the fact that the final pigmentary preparation maintains these performance with a percentage of at least 60%, more preferably 70%, still more preferably 85%, preferably up to 95% by weight of the at least one pigmentary additive with respect to the total weight of the pigmentary preparation.

As clearly shown in the following experimental part, the fineness of the milled particles of the at least one pigmentary additive of the final pigmentary preparations of the invention is represented by an advantageously limited interval.

The final pigmentary preparation of the invention has an exceptional homogeneity, namely deriving from the particle size D90 (by number) of the milled pigment particles being at most 4 micrometers, with very few particles having a size greater than 5 micrometers.

As stated above, the universal pigmentary preparations comprise at least 60%, more preferably 70% by weight of at least one pigmentary additive with respect to the total weight of the pigmentary preparation, preferably 85% of organic pigments and preferably up to 95% of inorganic ones.

Since the pigmentary preparations of the invention are universal and have a high concentration of pigment, in another aspect the invention concerns a universal tinting system comprising a limited number of basic colours corresponding to a limited set of pigmentary preparations suitable for the preparation of manufactured plastic and rubber articles having different colour shades. The pigmentary preparations of the invention allow the preparation of colour tones by simple dry mixing of the monocoloured basic pigmentary preparations of the invention (about 16-22) without the need of a tailor-made processing of the mixture of pigments through the extrusion process.

Therefore, the invention also relates to a tinting system comprising a series of pigmentary preparations having desired shades of colours (RAL, NCS, BS etc.) obtainable by dry mixing two or more pigmentary preparations according to the invention.

The tinting system can be used for any plastic material. Preferably, any given tinting system can be used for at least three plastic materials.

Therefore in another aspect the invention relates to a use of the pigmentary preparation according to the invention to colour all the kinds of plastic materials. A plastic material is for example selected from Polyethylenic products (e.g., HDPE, LDPE, LLDPE, MDPE, EVA, EVOH, even if obtained from metallocenic catalyst systems); Polypropylenic products (e.g., PP, even if obtained from metallocenes, PP copolymers, EPR, EPDM); Styrenics (e.g., PS, SAN, HIPS, ABS, ASA); chlorovinylic Polymers (e.g. PVC, unplasticized and plasticized); Acrylics (e.g., PMMA, polyacrylates); Polyamides (e.g., PA6, PA6,6, PA11, PA12, and their copolymers); Polycarbonate and its blends (e.g. PC/ABS, PC/Polyesters); Polyesters (e.g. PET, PBT, copolysters); Polyurethanes (e.g., TPU); Thermoplastic Elastomers (e.g., TPO, TPV)

The invention will now be illustrated by some examples by way of example and not limitation of the invention.

EXPERIMENTAL PART

Preparations of the Invention

All used pigments are indicated below with the designation of the colour index universally used for the identification of the pigments Example 1

Preparation of the Pigmentary Preparation XP303-C (Pigment Concentration=85%)

6800 g of P.Red 254 pigment (available as SR2P by the firm Cinic) were mixed and milled with 1.200 g of the dispersing agent Disperplast 1018 provide by the firm BYK.

The dry-milling apparatus was a discontinuous apparatus provided with 4 rotors. Process parameters: 1 minute at the peripheral speed of 6 m/s, 14 minutes at the peripheral speed of 15 m/sec and then 6 min at the peripheral speed of 25 m/sec; the temperature reached 72° C.

The pigmentary preparation so obtained corresponded micro-granules.

The following dimensional values of pigmentary additive particle size in the pigmentary preparation, analysed in butyl acetate dispersion by means of a laser Beckman Coulter Particle Size Analyzer:

D10=0.571 µm
D50=0.790 µm
D90=1.034 µm

Granulometry of the microgranules: in the range of 80 and 350 µm.

Example 2

Preparation of the Pigmentary Preparation XP901 (Pigment Concentration=80%)

6400 g of carbon black pigment PBL-7 (Carbon Black Special Black 100 of the firm Orion) and 1600 g of dispersant Disperplast 1018 by the firm BYK. mixed and milled by means of a discontinuous dry milling apparatus provided with 4 rotors. Process parameters: 1 minute at the peripheral speed of 6 m/s, 14 minutes at the peripheral speed of 15 m/sec and then 6 min at the peripheral speed of 25 m/sec; the temperature reached 132° C. The obtained composition was in the form of micro-granules dust free.

D50, measured as in Example 1, of the pigmentary additive in the pigmentary preparation=1.5 µm Granulometry of the microgranules: 80-350 µm Example 3

Preparation of the Pigmentary Preparation XP307C (Pigment Concentration=90%)

5400 g of pigment PRed 101 (Bayferrox 130 M of the Firm Lanxess) were mixed and milled by a discontinuous dry milling apparatus provided with 4 rotors with 600 g of dispersant Disperplast 1018 by the firm BYK.

Process parameters: 1 minute at the peripheral speed of 6 m/s, 14 minutes at the peripheral speed of 25 m/sec The temperature reached 50° C.

The obtained composition was in the form of free-flowing powder.

D50, measured as in Example 1, of the pigmentary additive in the pigmentary preparation=1.2 µm Granulometry of the particles of the powder<50 µm Example 4

Preparation of the Pigmentary Preparation XP001 PW6 (Pigment Concentration=90%)

5400 g of pigment PW6 101 (CR-826 of the firm Tronox) were mixed and milled by a discontinuous dry milling apparatus provided with 4 rotors with 600 g of dispersant Disperplast 1018 by the firm BYK.

Process parameters: 1 minute at the peripheral speed of 6 m/s, 14 minutes at the peripheral speed of 25 m/sec and then 6 min at the peripheral speed of 30 m/sec;

The obtained composition was in the form of micro-granules.

D50, measured as in Example 1, of the pigmentary additive in the pigmentary preparation=0.7 µm Granulometry: 80-350 µm Example 5

Preparation of the Pigmentary Preparation XP105-C (Pigment Concentration=80%)

4800 g of the pigment PY139 (Paliotol L2140 of the firm BASF) were mixed and milled by a discontinuous dry milling apparatus provided with 4 rotors, with 1200 g of dispersant Disperplast 1018 by the firm BYK.

Process parameters: 1 minute at the peripheral speed of 6 m/s, 14 minutes at the peripheral speed of 15 m/sec. The temperature reached 52° C.

The thus obtained preparation was in the form of a free-flowing powder.

D50, measured as in Example 1, of the pigmentary additive in the pigmentary preparation=1.6 μm Granulometry of the particles of the powder<50 μm

Example 6

Preparation of the Pigmentary Preparation XP502-C (Pigment Concentration=80%)

4800 g Pigment Blue Phtalo PB 15:1 (MP PV Blu Solido a 4R of the firm Clariant) were mixed and milled using a dry-milling discontinuous apparatus provided with 4 rotors, with 1200 g of dispersant Disperplast 1018 by the firm BYK.

The process parameters were: 1 minute at the peripheral speed of 6 m/s; 14 minutes at the peripheral speed of 15 m/sec.

The thus obtained preparation was in the form of free-flowing powder and was analysed in butyl acetate dispersion by means of a laser Beckman Coulter Particle Size Analyzer, optical model Fraunhofer.rf780z. The particle size of the pigmentary additive in the preparation was D10=0.746 μm D50=1.526 μm D90=3.269 μm Granulometry of the particles of the powder<50 μm as measured with a Digital Electromagnetic Sieve Shaker of Filtra Vibration mod. FTL 0200

Example 7

Preparation of the Green Shade for the Tinting System of the Invention

For obtaining a shade of green, three products of the invention were dry blended (time=2 minutes) by means of a mixer: the product XP001 PW6 prepared in Example 4 (dosage=75% of the product of example 4, which is a white with pigment concentration of 90%)+the product XP502-C PB 15:1 prepared in Example 6 (dosage=39% of the product of example 6 with pigment concentration of 80%)+the product XP105-C PY139 prepared in Example 5 (dosage=1.63% of the product of example 5 with pigment concentration of 80%) which is a yellow. It was obtained a green tone. The green tone was perfectly homogeneous upon visual examination.

Example 8

Preparation of Dark Blue Shade for the Mixing System of the Invention

For obtaining a shade of dark blue three products of the invention were dry blended (time=2 minutes) by means of a normal mixer: the product of Example 2 XP901 PBL-7 (dosage 30% of the product of Example 2, which is a black with pigment concentration of 80%)+XP001 PW6 of Example 4 (dosage=70% of the product of Example 4, which is a white with pigment concentration of 90%)+XP502-C PB 15:1 Example 6 (dosage=16.25% of the product of example 6 which is a blue with pigment concentration of 80%). It is obtained a dark blue colour if the preparations of the invention were dry mixed. It is obtained a dark blue tone perfectly comparable with the quality obtainable with a known masterbatch processed by means of the traditional extrusion process.

Example 9

Evaluation of Samples Coloured with Pigmentary Preparations of the Invention ABS/SAN plates coloured by means of the following process were prepared.

Sample 1: Plate Coloured with XP303-C

In an extruder by CDM ENGINEERING srl, model ES-65, ABS+SAN (50-50%) were introduced together with the preparation of Example 1 (XP303-C), this latter in an amount of 0.70% by weight.

The extrusion temperatures were:

Cylinder 1: 200° C., Cylinder 2: 210° C., Cylinder 3: 230° C., Cil. Deg. 4: 240° C., Cylinder 5: 235° C., plate: 230° C., head: 230° C.

The product leaving the extruder was then printed with a press by IMEX ITALY, SM 50T. The moulding temperatures were: Zone 1: 220° C., Zone 2: 230° C., Zone 3: 240° C., nozzle: 230° C.

Sample 2: ABS-SAN Plate Coloured with XP307C

Following the procedure and using the same equipment of sample 1, sample 2 was produced using the preparation XP307C of Example 3 in an amount of 0.60% by weight.

Sample 3: ABS-SAN Plate not Coloured

Following the procedure and using the same equipment of sample 1, sample 3 was produced using ABS-SAN blend not coloured.

The three samples thus prepared were subjected to the following tests (carried out by the POLYTECHNIC OF MILAN, DEPARTMENT OF CHEMICAL MATERIALS AND CHEMICAL ENGINEERING "Giulio Natta" Polytechnic Polymer Testing Laboratory): Colour fastness (before and after Xenotest); Melting Flow Rate (MFR); Thermogravimetric analysis; Hardness Rockwell; IZOD Notched; Migration; Resistance vs chemicals (ESC).

Aging tests (Xenotest) according to ISO 4892-2:2006 (AMF2009) with Solarbox 3000e equipment and exposure to xenon, irradiance: 550 W/m2, lamp: 2500 W; intensity measured on the sample surface, air-cooled; Filter: UV OUTDOOR Filter (280 nm) installed between the lamp and the test chamber; Thermometer: B.S.T. (black-standard thermometer) Temperature: 65±3° C. (with lamp on); Cycle: continuous radiation.

The following tests were performed on the samples before and after aging (Xenotest):

Colour fastness: through the method UNI EN 20105/A02: 1996, the grey scale according to the method with colour variation between 1 and 5 (1=maximum variation; 5=no change);

Melt Flow Rate: through the method ASTM D1238:2013 (Load=5 Kg; Test Temperature=230° C.)

Rockwell Hardness: through the method UNI EN ISO 2039-2:2001

Izod Impact Test: through the method UNI EN ISO 180:2009.

Colour variation (UNI EN 20105/A02: 1996): initial and after xenotest

Global Migration in water: Colour migration according to the method of the Italian Ministry of Health, DM 74, Apr. 6, 2004 by placing the just manufactured samples 1-3 for 24 hours in contact with water at a temperature of about 40° C.

The results shown in Table 1 were obtained.

TABLE 1

| Sample nr. | MFR (g/10 min) Just manufactured | MFR (g/10 min) After Xenotest | IZOD test (kJ/m2) Just manufactured | IZOD test (kJ/m2) After Xenotest | Rockwell Hardness R scale Just manufactured | Rockwell Hardness R scale After Xenotest | Grey scale After Xenotest | Colour variation After Xenotest | Migration (ppm) |
|---|---|---|---|---|---|---|---|---|---|
| 1 | 8.58 | 9.08 | 14.0 | 5.14 | 115.4 | 112.6 | 5 | 2.13 | 0 |
| 2 | 8.22 | 10.08 | 15.2 | 6.51 | 115.7 | 113.1 | 5 | 0.82 | 0 |
| 3 | 11.19 | 11.96 | 8.28 | 2.62 | 83.8 | 108.5 | ½ | 14.42 | 0 |

The MFR data, as shown in Table 1, demonstrate the processability and the good dispersion of the coloured samples (not relevant differences if compared with the non-coloured sample). The Xenotest results show minimal variations, both for the non-coloured sample (sample 3) and for both samples coloured with the preparations of the invention (samples 1 and 2). In any case, the observed variations, approximately of 1-2 units, are below the range for known coloured samples subjected to 1000 hours of aging by the Xenotest.

The Izod test (Impact Strength) shows much higher results (+77%) for coloured samples (with the pigmentary preparations of the invention) compared to the non-coloured samples, as confirmed by examining the areas subjected to fracture, which showed a homogeneous bleaching and a well-developed deformation process. The fractured surface of the coloured sample 3 was instead less homogeneous, showing areas with irregular depressions.

The higher decrease of the initial value, after 1000 hours of aging by the Xenotest, was detected with reference to the sample 3 (not coloured).

The Rockwell Hardness test or Rockwell Hardness highlights: a) before Xenotest aging, significantly higher values (+37%) for samples coloured with the pigmentary preparation of the invention; b) after 1000 hours of Xenotest aging, values indicating an opposite behaviour between coloured and non-coloured samples. While coloured samples virtually retained their original values, showing only a moderate change, the non-coloured sample had suffered a strong reduction. This phenomenon confirmed the increased fragility of the non-coloured sample (as confirmed by the results of the Impact test).

The results of the colour fastness test, measured after 1000 hours of Xenotest exposure, were amazing for coloured samples. No discolouration was observed in the colorimetric analysis and in the grey scale. In short, the behaviour of coloured samples was significantly better than the one of the non-coloured sample.

In all samples the total migration, under the specific conditions of the test, was found to be below the detection limits.

All samples were eligible for contact with food.

Example 10

Evaluation of Samples Coloured with a Pigmentary Preparation of the Invention

The pigmentary preparation of example 1 (XP303 C) was compared with the pure pigment, by coloring polypropylene.

Tests were performed with the following instruments:

Analytical balance (Accuracy: 0.001 g), Precision balance (Accuracy: 0.01 g), Mixer (Model: CY-37, rotating speed: 0-55 r/min, timer:0.1 s-99.99H, motor power:90-180 W, diameter of innercylinder:50 mm, depth:60 mm), Twin-screw extruder (Model: CTE 20, rotating speed:600 rpm/min, motor power: 4KW, L/D=56, Diameter:21.7 mm) Injection molding machine (Model: HTF58X1, Model of screw: A-D26, closing force:580 KN, shot volume:66 cm3); Spectrophotometer (Model: Konica-MinoltaCM-2600d)

The samples of polypropylene were tested at 0.5% pigment content or 0.1% pigment content.

The procedure consisted in hand mixing polypropylene resin and pigment powder or the pigmentary preparation XP303 C of the example 1 of the invention and silicone oil until achieving an homogeneous mixture. The mixture so obtained was injection molded to make chips Both the samples (comparison and of the invention) exhibited good dispersibility. No visible spots are detected.

The process of the invention improved significantly the its FPV (Filter Value measured with DIN EN 13900-5.

Filter value using neat pigment=5.250 bar/g; XP303 C=2.420 bar/g

In reduction 1:10 the preparation XP303 C according to the invention has an higher tinting strength.

At 0.5% pigment content or equal content of preparation (corresponding at 15% less pigment) the preparation of the invention XP303 C had a tinting strength 130% greater than for the pure pigment. The dispersibility clearly indicated the preparation of the invention XP303 C had a better dispersibility, again proved by measuring the Filter Value.

Example 11

Evaluation of Samples Coloured with a Pigmentary Preparation of the Invention HP 714 and HP 729 (Pigment Concentration=90%)

HP 714: 4.500 g of pigment P.Brown 24 (Heucodur Yellow G 9239 of the Firm Heubach) were mixed and milled by a discontinuous dry milling apparatus provided with 3 rotors with 500 g of dispersant Disperplast 1018 by the firm BYK.

Process parameters: 1 minute at the peripheral speed of 6 m/s, 29 minutes at the peripheral speed of 30 m/sec, the temperature reached 110° C.

The obtained composition was in the form of granules.

Granulometry of the particles of the granules<500 μm

HP 729: 4.500 g of pigment P.Brown 24 (Heucodur Yellow G 9239 of the Firm Heubach) were mixed and milled by a discontinuous dry milling apparatus provided with 3 rotors with 500 g of dispersant P 4100 (liquid at room temperature) by the firm BYK.

Process parameters: 1 minute at the peripheral speed of 6 m/s, 29 minutes at the peripheral speed of 30 m/sec, the temperature reached 110° C.

The obtained composition was in the form of granules.

Granulometry of the particles of the granules<500 μm

The pigmentary preparations (HP 714 and HP 729) were compared by coloring ABS through the test according to DIN EN ISO 294-1.

Tests were performed with the following instruments:

Precision balance (Accuracy: 0.002 g), Twin-screw extruder (Model: Leistritz, ZSE 18HP-35D, rotating speed: 125 rpm/min, motor power: 9.4 kW, L/D=35, Diameter: 18 mm) Injection molding machine (Model: Arburg, 300C 500-170, Model of screw: 30 L 873 SW, shot volume: 13.5 cm$^3$); Spectrophotometer (Model: Datacolor, Spectraflash SF 300)

Tinting strength measurement: The relative tinting strength is calculated from the reduction versus the standard in correspondence to DIN EN ISO 787-24.

The samples of acrylonitrile butadiene styrene (ABS) were tested at 0.1% pigment content, in 1:10 reduction.

Preparation HP 714 showed significantly better dispersibility than HP 729. This was evidenced by difference in the tinting strength. The tinting strength of HP 714 was 37% higher than of HP 729.

| | ABS | | | | | | |
|---|---|---|---|---|---|---|---|
| Product | ΔL | Δa | Δb | ΔC | ΔH | ΔE | Strength |
| HD G 9235 #11721756-0 | | | | Standard | | | |
| HP 714 | −0.3 | −0.1 | 0.3 | 0.3 | 0.1 | 0.5 | 105.7 |
| HP 729 | 1.4 | −0.9 | −1.3 | −1.5 | 0.7 | 2.1 | 76.6 |

Another indication of the better dispersability was the quality of prepared batch. Before the injection molding each colour preparation was premixed with the carrier material (ABS) by means of twin-screw extruder. Opposite to the HP 714, the produced batch of HP 729 was inhomogeneous containing granules of very different tinting strengths.

In view of the fact that the sole difference between the two preparations was the used dispersing agent, the dispersing agent P 4100 was not suitable to colour ABS.

Example 12

Comparative Example

Preparation of the pigmentary preparation (pigment concentration=80%) 1760 g of Monarch 1100 carbon black (available by the firm Cabot Corporation) were mixed and ground with 440 g of the dispersing agent Atmer 116 (liquid at room temperature) provided by the firm CRODA.

The dry-milling apparatus was a discontinuous apparatus provided with 3 rotors.

Process parameters: 1 minute at the peripheral speed of 6.1 m/s and then 39 minutes at the peripheral speed of 31 m/sec; the temperature reached 66° C.

The pigmentary preparation so obtained was in the form of a powder.

A masterbatch containing 30% carbon black was by combining the pigmentary preparation with styrene acrylonitrile polymer (Kostill B755) using a 1.644 L Banbury mixer by Farrel Corporation. The following process conditions were applied: chamber temperature of 40° C.; rotor temperature of 40° C.; mixing time post flux of 90 seconds; ram pressure of 4.2 bars; and rotor speed of 182 RPM. The product was discharged at 190° C. The product was cooled down and ground into coarse granules with a Pallman PS3 grinder having 3 rotating blades.

The masterbatch was then diluted (30=>5% carbon black in GP22 acrylonitrile butadiene styrene polymer) by extrusion on a single screw (LabTec—30 mm, 30 L/D, temperature from Die to Hopper: 220-220-220-210-200° C.), and cut into pellets by a strand-cutting pelletization system The pellets were dried overnight at 70° C.

The resulting product was again diluted with ABS GP22 from 5 to 0.75% carbon black during injection molding into plaques and impact test bards. The moulding temperatures were: Zone 1: 200° C., Zone 2: 220° C., Zone 3: 240° C., nozzle: 230° C. A comparative masterbatch in styrene acrylonitrile polymer was prepared using Black Pearls 1100 carbon black (Cabot Corporation), a carbon black having the same surface area as Monarch 1100 carbon black but produced in pelletized form, using the same method described above for the pigmentary preparation. The masterbatch (30% carbon black by weight) was diluted and formed into plaques and impact test bards as described above.

Plates were analyzed for color Cie L*a*b* with a Ultra-Scan Vis from Hunterlab. IZOD impact resistance of notched specimens were measured according the ISO 180/A:2000 via CEAST Pendulum impact tester.

Results:

| | L* value (u.a) | Impact strength KJ/m$^2$ |
|---|---|---|
| BP1100 w/o binder | 7.68 | 11.4 |
| M1100/Atmer 116 dispersant | 8.44 | 9.4 |

The data above show that use of the Atmer 116 dispersant, which is a liquid at room temperature, to form the pigmentary preparation is detrimental to both color performance and impact strength in plastics prepared with the pigmentary preparation in comparison to plastics prepared with neat pigment.

The invention claimed is:

1. A dry-milled pigmentary preparation comprising:
at least one dispersing-wetting agent selected from the group consisting of wax-based powdered processing additives with pigment-affinic groups, acidic polyester based additives with pigment-affinic groups, polyethers modified with groups of high pigment affinity, copolymers of styrene and polyethers, amides of maleic acid, modified polyacrylate with groups of high pigment affinity, polyester based block copolymers, high molecular weight polyurethane polymers, polyester-polyamine-polyolefin terpolymers, and modified polysiloxanes with epoxy or urethane groups, the at least one dispersing-wetting agent having a melting point in the range 50-150° C.; and
at least one pigmentary additive selected from the group consisting of inorganic pigments, organic pigments, carbon black and dyes, wherein
the particle diameter D50 (by number) of the at least one pigmentary additive in the pigmentary preparation is the range from 0.5 to 3.5 μm, and
the pigmentary preparation comprises at least 70% by weight of the at least one pigmentary additive with respect to the total weight of the pigmentary preparation,
and wherein the pigmentary preparation is in the form of a) a free-flowing powder having particles with D20 of at least 0.8 microns and D90 up to 5 microns when measured in by a laser particle size analyzer in the dry state at a pressure of 3.5 bar or b) microgranules having granules with D20 of at least 10 microns and D90 up to 1000 microns when measured in a laser particle size analyzer in the dry state at a pressure of 3.5 bar.

2. The dry-milled pigmentary preparation of claim 1, wherein the pigmentary preparation includes less than 3% by weight of water.

3. The dry-milled pigmentary preparation according to claim 1, wherein the average particle diameter D90 (by number) of the at least one pigmentary additive in the pigmentary preparation is the range from 0.9 to 4 μm.

4. The dry-milled pigmentary preparation of claim 1, wherein the pigmentary preparation is miscible with at least three polymers selected from polyethylene-based polymers, polystyrene, styrene acrylonitrile, high impact polystyrene sheet, acrylonitrile butadiene styrene, acrylonitrile styrene acrylate, chlorovinylic polymers, polyacrylates, polyamides, polycarbonates, polyesters, polyurethanes, and thermoplastic elastomers.

5. The dry-milled pigmentary preparation according to claim 1, wherein a mixture of the pigmentary preparation with a polymer selected from polyethylene-based polymers, polystyrene, styrene acrylonitrile, high impact polystyrene sheet, acrylonitrile butadiene styrene, acrylonitrile styrene acrylate, chlorovinylic polymers, polyacrylates, polyamides, polycarbonates, polyesters, polyurethanes, and thermoplastic elastomers such that the mixture includes from 0.5 to 1% by weight of the pigmentary additive exhibits a tinting strength at least 20% better than for a mixture having the same composition but prepared by individually adding each component to a mixing apparatus and combining the components.

6. A tinting system comprising a plurality of pigmentary preparations of desired colour tone obtainable by dry mixing two or more dry-milled pigmentary preparations according to claim 1.

7. A method to colour a plastic material, said method comprising colouring said plastic material with the dry-milled pigmentary preparation according to claim 1.

8. A coloured composition comprising the dry-milled pigmentary preparation of claim 1 and a plastic material.

9. The coloured composition of claim 8, wherein the coloured composition includes from 0.5 to 1% by weight of the pigmentary additive and exhibits a tinting strength at least 20% better than for a mixture having the same composition but prepared by individually adding each component to a mixing apparatus and combining the components into a uniform mixture.

10. A method of manufacturing a pigment preparation, comprising:
introducing into a mill apparatus at least one dispersing-wetting agent selected from the group consisting of wax-based powdered processing additive with pigment-affinic groups, acidic polyester based additive with pigment-affinic group, modified polyether with groups of high pigment affinity, copolymers of styrene and polyethers, amides of maleic acid, modified polyacrylate with groups of high pigment affinity, polyester based block copolymer, and high molecular weight polyurethane, polyester-polyamine-polyolefin terpolymers, and modified polysiloxanes with epoxy or urethane groups, having said one dispersing-wetting agent a melting point in the range from 50-150° C., and at least one pigmentary additive selected from the group consisting of inorganic pigment, organic pigment, carbon black and dyes, the mill apparatus comprising at least two rotors;
mixing and milling the dispersing-wetting agent and the at least one pigmentary additive with one another to form the pigmentary preparation, wherein the average peripheral speed of the mill apparatus is from 5-50 m/s; and
recovering the pigmentary preparation, the pigmentary preparation comprising at least 70% by weight of the at least one pigmentary additive, and
wherein the recovered pigmentary preparation is in the form of a) a free-flowing powder having particles with d20 of at least 0.8 microns and d90 up to 5 microns when measured in by a laser particle size analyzer in the dry state at a pressure of 3.5 bar or b) microgranules having granules with d20 of at least 10% microns and d90 up to 1000 microns when measured in by a laser particle size analyzer in the dry state at a pressure of 3.5 bar.

11. The method of claim 10, wherein the mixing and milling is conducting for 10-90 min.

12. The method of claim 10, wherein the highest temperature achieved by the mixture of dispersing-wetting agent and pigmentary additive during mixing and milling is from 50 to 150° C.

13. The method of claim 10, wherein the particle diameter D90 (by number) of the at least one pigmentary additive in the recovered pigmentary preparation is the range from 0.9 to 4 μm.

14. The method of claim 10, wherein the particle diameter D50 (by number) of the at least one pigmentary additive of the recovered pigmentary preparation is the range from 0.5 to 3.5 μm.

15. The method of claim 10, wherein the mill apparatus is a dry mill apparatus.

16. The method of claim 10, wherein at least one of the rotors is a blade rotor.

17. The method of claim 10, wherein the recovered pigmentary preparation is in the form of microgranules having a granulometry in the range from 60 to 500 μm.

18. The method of claim 10, wherein the recovered pigmentary preparation is in the form of a free-flowing powder having a granulometry less than 50 μm.

* * * * *